(12) United States Patent
Bouti

(10) Patent No.: US 7,291,304 B2
(45) Date of Patent: Nov. 6, 2007

(54) COINJECTION MOLDING COOLED SHOOTING POT CYLINDER

(75) Inventor: Abdeslam Bouti, Swanton, VT (US)

(73) Assignee: Husky Injection Molding Systems Ltd. (CA)

( * ) Notice: Subject to any disclaimer, the term of this patent is extended or adjusted under 35 U.S.C. 154(b) by 659 days.

(21) Appl. No.: 10/880,493

(22) Filed: Jul. 1, 2004

(65) Prior Publication Data

US 2006/0017199 A1 Jan. 26, 2006

(51) Int. Cl.
*B29C 45/53* (2006.01)
*B29C 45/72* (2006.01)

(52) U.S. Cl. ............... 264/328.14; 264/328.19; 425/130; 425/547; 425/557

(58) Field of Classification Search ............ 264/328.8, 264/328.14, 328.19; 425/130, 547–549, 425/557–561
See application file for complete search history.

(56) References Cited

U.S. PATENT DOCUMENTS 2,268,026 A * 12/1941 Walter et al. ............... 425/159
2,961,705 A * 11/1960 Wacker ....................... 425/166
4,717,324 A    1/1988 Schad et al.
5,374,178 A * 12/1994 Nakayama .................. 425/130
5,605,707 A *  2/1997 Ibar ........................... 425/144
6,241,932 B1   6/2001 Choi et al.
6,527,539 B1   3/2003 Ujma et al.
6,555,044 B2 *  4/2003 Jenko ....................... 264/328.1
2002/0094355 A1 7/2002 Sattler et al.
2004/0022893 A1 2/2004 Lebreton \* cited by examiner

*Primary Examiner*—Jill L. Heitbrink
(74) *Attorney, Agent, or Firm*—Katten Muchin Rosenman LLP

(57) ABSTRACT

Coinjection molding shooting pot cooling apparatus and method are configured to cool a shooting pot cylinder which, in combination with a shooting pot piston, injects a melt through a coinjection nozzle having at least two melt channels ending at the same gate. Preferably, a heat sink sleeve is disposed to contact an outer surface of a rear portion of the shooting pot cylinder. The heat sink sleeve is configured to remove sufficient heat from the shooting pot cylinder to increase the viscosity of the melt therein, thus reducing melt leakage between the shooting pot piston and the shooting pot cylinder.

16 Claims, 2 Drawing Sheets

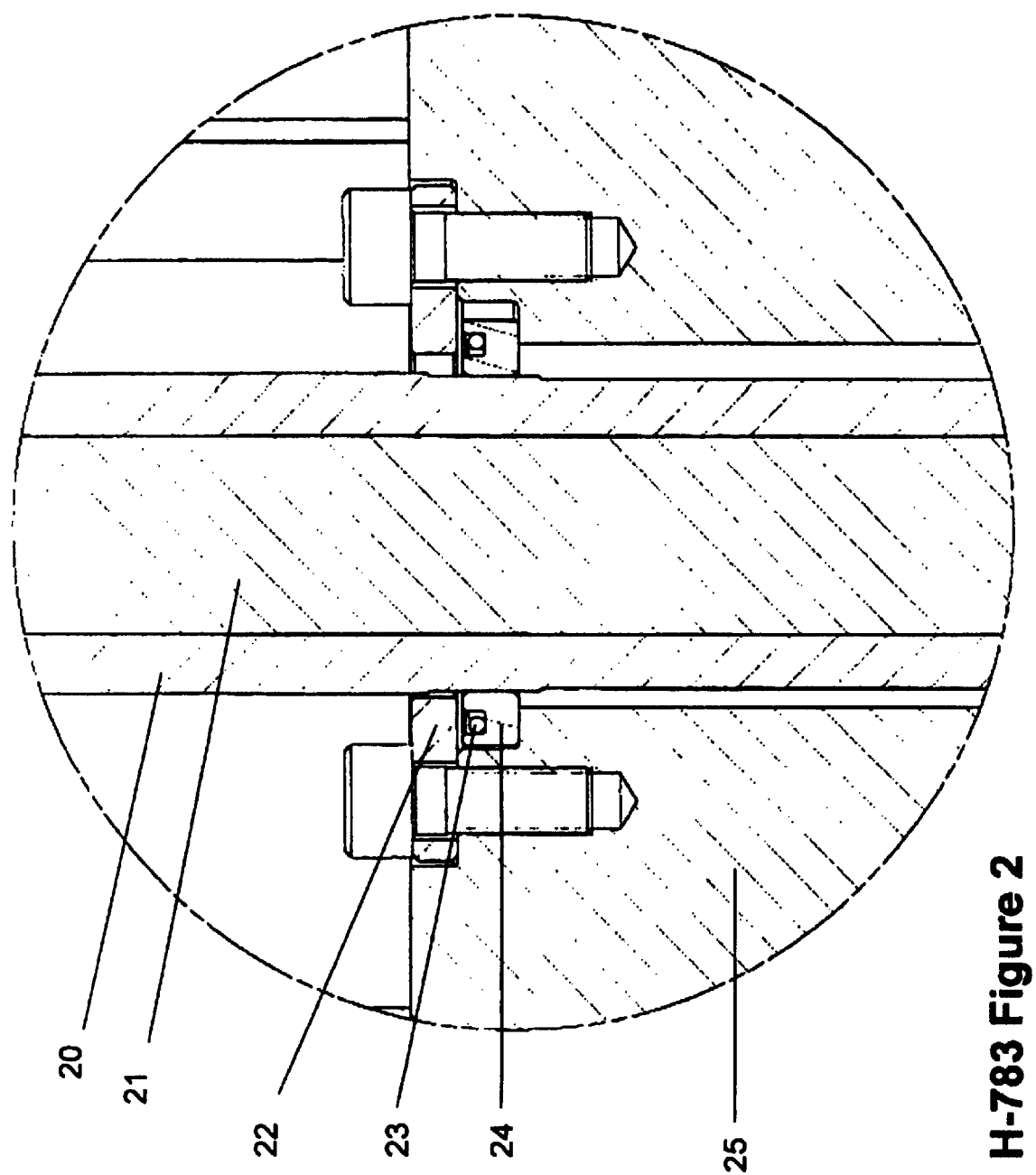
H-783 Figure 2

COINJECTION MOLDING COOLED SHOOTING POT CYLINDER

BACKGROUND OF THE INVENTION

1. Field of the Invention

The present invention relates to coinjection molding shooting pot apparatus and method that cools the shooting pot cylinder, thereby raising the viscosity of the melt therein, thus reducing leakage of the melt between the shooting pot cylinder wall and the shooting pot piston.

2. Description of Related Art

Coinjection molding is typically used to mold multi-layered plastic packaging articles having a laminated wall structure. Each layer is typically passed through a different annular or circular passageway in a single nozzle structure and each layer is partially, sequentially, injected through the same mold gate. Some coinjection hot runner systems include shooting pots to meter material of one plastic resin so that each cavity of a multi-cavity mold receives an accurate dose of that resin in the molding cycle. A shooting pot piston within the shooting pot cylinder is actuated to discharge the resin into a hot runner manifold, which carries the resin to the coinjection nozzle and then into the mold cavity.

Often, a substantial amount of resin drools through the clearance between the shooting pot cylinder and the piston during normal molding operations, when the shooting pot is pressurized and the resin is at high temperature. This drool typically increases with the increase of the piston-to-cylinder wall clearance and with the cylinder temperature. The drool also increases with the decrease of the permanent engagement between the piston and the cylinder wall. Any significant leakage of the resin not only reduces the accuracy of the shot size being injected, but also wastes expensive resin and causes a build-up of degraded resin in the space between the shooting pot cylinder exterior wall and the manifold plate that eventually requires stopping the operation for cleanup. Decreasing the piston-to-cylinder clearance close to a line-to-line fit is not advantageous because of the high risk of the piston seizing inside the cylinder. Also, increasing the piston-to-cylinder engagement in an attempt to minimize drool is often limited by the constraints on the size of the mold.

Attempts have been made to minimize the resin leakage past the shooting pot piston by adjusting the respective sizes of the piston's exterior diameter and the cylinder's interior diameter. A variety of such "sliding fit" tolerance combinations can be tried until the resin leakage is minimized to an acceptable level. However, this fit may have to be readjusted for different resins and for operating the system at different process temperatures where thermal expansion may cause the effectiveness of the "sliding fit" to change. Furthermore this "cut and try" approach is costly as each attempt requires dismantling the hot runner.

U.S. Pat. No. 4,717,324 to Schad discloses a coinjection hot runner assembly with shooting pots. The shooting pot chambers are an integral part of the hot runner manifold that is a heated component of the assembly. The shooting pot pistons that operate within the shooting pots must both slide and seal throughout their operating stroke. There is no disclosure of providing cooling or even lowering the temperature of the piston/shooting pot wall interface to reduce leakage.

U.S. Pat. No. 6,241,932 to Choi shows, in FIG. 1, a conventional two stage (preplasticizing) injection unit including a shooting pot and piston assembly. There is no disclosure of cooling the rear end of the shooting pot to minimize leakage or drooling.

U.S. Pat. No. 6,527,539 to Ujma teaches a shooting pot configuration of an injection molding machine. There is no disclosure of cooling the rear end of the shooting pot to minimize leakage or drooling. See also:

- U.S. patent application Ser. No. 10/879,576 entitled INJECTION MOLDING MACHINE SHOOTING POT WITH INTEGRAL CHECK VALVE;
- U.S. patent application Ser. No. 10/879,581 entitled INJECTION MOLDING MACHINE SPIGOTTED SHOOTING POT PISTON;
- U.S. patent application Ser. No. 10/879,621 entitled APPARATUS AND METHOD FOR SEALING INJECTION UNIT AND SPRUE;
- U.S. patent application Ser. No. 10/879,575 entitled APPARATUS AND METHOD FOR ACTUATION OF INJECTION MOLDING SHOOTING POTS;
- U.S. patent application Ser. No. 10/879,582 entitled CONTROL SYSTEM FOR A DYNAMIC FEED COINJECTION PROCESS;
- U.S. patent application Ser. No. 10/880,494 entitled HOT RUNNER COINJECTION NOZZLE WITH THERMALLY SEPARATED MELT CHANNELS; and
- U.S. patent application Ser. No. 10/887,353 entitled APPARATUS AND METHOD FOR INJECTION MOLDING SHOOTING POT WEDGE FEATURE.

Thus, what is needed is a coinjection molding shooting pot structure which substantially reduces leakage between the shooting pot piston and the shooting pot cylinder wall, and is relatively inexpensive to design, install, and maintain.

SUMMARY OF THE INVENTION

It is an advantage of the present invention to overcome the problems of the related art and to provide a coinjection shooting pot structure which efficiently minimizes melt leakage between the shooting pot piston and the shooting pot cylinder wall by cooling appropriate portions of the shooting pot structure to increase the viscosity of the melt to reduce the leakage.

According to a first aspect of the present invention, a novel combination of structure and/or steps are provided for a coinjection molding shooting pot apparatus configured to inject a melt through a coinjection nozzle having at least two melt channels ending at the same gate. A shooting pot cylinder is configured to hold the melt, and a shooting pot piston is configured to discharge the melt from the shooting pot cylinder. Cooling structure is disposed to contact an outer surface of the shooting pot cylinder and remove heat therefrom.

According to a second aspect of the present invention, a novel combination of structure and/or steps are provided for a coinjection molding shooting pot cooling apparatus configured to cool a shooting pot cylinder which, in combination with a shooting pot piston, injects a melt through a coinjection nozzle having at least two melt channels ending at the same gate. A heat sink sleeve is disposed to contact an outer surface of a rear portion of the shooting pot cylinder. The heat sink sleeve is configured to remove sufficient heat from the shooting pot cylinder to increase the viscosity of the melt therein, thus reducing melt leakage between the shooting pot piston and the shooting pot cylinder.

According to a third aspect of the present invention, a novel combination of structure and/or steps are provided for a coinjection molding machine including a mold cavity, and a coinjection nozzle having at least two melt channels ending at the same gate, and configured to inject a melt into the mold cavity. A hot runner manifold is configured to carry the melt to the coinjection nozzle. A shooting pot cylinder is configured to discharge the melt to the hot runner manifold, and a shooting pot piston is configured to discharge the melt from the shooting pot cylinder. Heat sink structure is configured to remove heat from the shooting pot cylinder to increase the viscosity of the melt therein.

According to a fourth aspect of the present invention, a novel combination of steps are provided for a method of cooling a coinjection mold shooting pot cylinder configured to inject a melt through a coinjection nozzle having a least two melt channels which end at the same gate, including the steps of: (i) charging a shooting pot cylinder with a melt; and (ii) removing heat from a portion of the shooting pot cylinder to increase the viscosity of melt therein to reduce melt leakage between the shooting pot cylinder and a shooting pot piston.

BRIEF DESCRIPTION OF THE DRAWINGS

Exemplary embodiments of the presently preferred features of the present invention will now be described with reference to the accompanying drawings.

FIG. 2 shows an alternate embodiment of the shooting pot cylinder cooling feature.

DETAILED DESCRIPTION OF THE PRESENTLY PREFERRED EXEMPLARY EMBODIMENTS

1. Introduction

Figure 1:
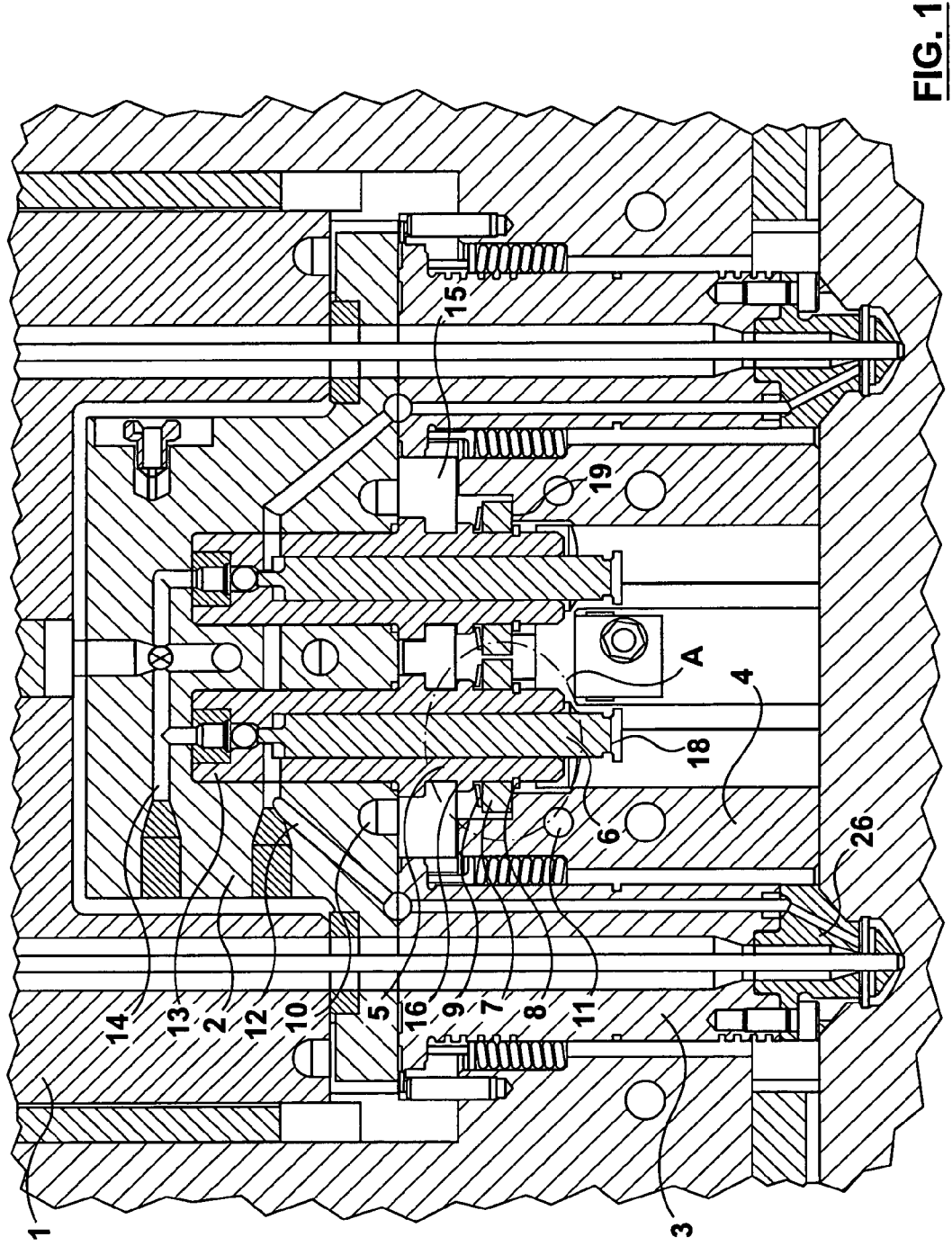
FIG. 1 is a partial sectional view of a coinjection hot runner assembly showing a shooting pot assembly according to a first embodiment according to the present invention.

The present invention will now be described with respect to several embodiments in which a plastic resin coinjection molding machine has first and second shooting pots which respectively inject "A" and "C" resins through different coinjection nozzle melt channels into a mold cavity. However, the present invention may find applicability in other injection molding applications as well, such as injection molding of metals, composites, etc. The below description will generally be limited to a discussion of a single shooting pot. However, it is to be understood that this description could apply to one or more of the shooting pots in a coinjection molding machine.

Briefly, the preferred embodiments of the present invention provide for cooling at least one shooting pot cylinder by use of a heat transfer sleeve adjacent the shooting pot cylinder. Such a configuration thus relies on melt viscosity to reduce leakage, controls the leakage thermally and not mechanically, and eliminates the need to use tight tolerances between the piston and cylinder. Moreover, since there is no change in the shooting pot geometry when fine tuning the cooling features (i.e., by modifying the heat sink sleeve geometry, the contact surface with the plate, or the contact surface with the shooting pot), lowering the temperature in the top of the cylinder to precisely below the no-flow temperature of the resin can reduce the leakage significantly. The preferred embodiments also accommodate for heat expansion of the hot runner manifold as well as for that of the shooting pot by utilizing a spring for producing a loaded contact between the hot shooting pot and the cool plate through heat-sink sleeve.

2. The Structure of the First Embodiment

FIG. 1 shows a portion of a coinjection hot runner assembly and mold comprising, in part, a first hot runner manifold 1, a second hot runner manifold 2, a nozzle housing 3, a cooled manifold plate 4, a shooting pot cylinder 5, a shooting pot piston 6, a heat-sink sleeve 7, a retaining ring 8, and a spring 9. The hot runner manifolds 1 and 2 are heated by heaters 10, and the manifold plate 4 is cooled by coolant flowing through cooling channels 11. The second melted plastic resin "C" is conveyed through second melt channels 12 in the heated second manifold 2 to the nozzle 3. A check valve assembly 13 is located in one end of the shooting pot cylinder 5 such that the incoming resin "C" from an inlet channel 14 is prevented from backflowing when the shooting pot piston 6 is advanced to inject the resin "C" into the mold cavity via the second hot runner melt channel 12 and the corresponding coinjection nozzle melt channel 26. Preferably, there is a thermally insulative air gap 15 that separates the manifolds from their surrounding plates.

The diametric sizing of the piston 6 in the shooting pot cylinder 5 is such that the piston 6 is able to slide without allowing a substantial amount of the resin contained therein from leaking past the piston sidewall. For example, a clearance of 10 to 20 microns allows the piston 6 to freely travel inside the shooting pot cylinder 5. The resin between the piston sidewall and the piston cylinder wall acts like a lubricant.

By providing the heat sink sleeve 7 to cool the rearward end of the shooting pot cylinder 5, a more certain "sliding fit" configuration can be reliably provided. The heat sink sleeve 7 provides a path for heat to be thermally conducted from the rear end of the shooting pot cylinder 5 to the cooled manifold plate 4. This decreases the temperature of the resin "C", increasing its viscosity and preventing substantial leakage past the piston walls. The heat-sink sleeve 7 is tightly fitted (e.g., a 5 to 10 micron clearance fit) around the shooting pot cylinder 5 to be able to slide axially therealong and provide thermal expansion accommodation while keeping intimate contact with shooting pot cylinder for effective heat transfer.

The heat sink sleeve 7 is retained in position on the shooting pot cylinder's external diameter by the retaining ring 8 and the spring 9 acting against a shoulder 16, which constantly urges the heat-sink sleeve 7 against its seat 19 in the manifold plate 4 to enhance the cooling. By cooling this rear portion of the shooting pot cylinder wall, any resin leakage between the wall's interior surface and the piston will be cooled sufficiently to reduce its flow significantly, thereby virtually eliminating leakage, without denying the lubricating properties the resin provides to the shooting pot action. The thermal profile of the shooting pot cylinder is a function of the areas of contact between the heat sink sleeve 7 with the cooled manifold plate 4 and with the shooting pot cylinder itself. These contact areas are optimized to produce (i) a temperature below the no-flow temperature of the resin "C" in the area of the piston inside the shooting pot cylinder 5 where these two components are permanently in contact, and (ii) a temperature equivalent to the molding temperature of the resin in the rest of the cylinder (metering area).

The cooling of the shooting pot cylinder 5 can be fine tuned by judicious selection of the material(s) which comprise the heat sink sleeve 7, the longitudinal length and radial width (outside diameter minus inside diameter) of the sleeve, the shape of the sleeve (the inner surface thereof may be profiled with sinusoidal or stepped shapes), the closeness and extent of the contact between the sleeve and the cooled manifold plate and the cylinder wall, etc. Preferably, the heat sink sleeve 7 is made of tool steel, has a longitudinal length of 6-12 mm, an inside diameter of 10 mm, and an outside diameter of 20 mm. Preferably, the area that the sleeve 7 contacts the cooled manifold plate 4 is the same area as it contacts the outside diameter of the cylinder wall. Preferably, the sleeve 7 contacts the cylinder wall 5 throughout the entire inner surface of the sleeve. If desired, the sleeve 7 can be provided with cooling fins, cooling channels with coolant flowing therein, or other cooling aids, etc.

3. The Process of the First Embodiment

In operation, the shooting pot cylinder 5 is charged with resin "C" by an injection unit (not shown) feeding the resin through the inlet channel 14, past the check valve 13. This infeeding resin causes the shooting pot piston 6 to move away from the check valve 13, extending outwardly from the shooting pot cylinder 5. When the shooting pot piston 6 is stopped by its actuation rod (not shown) at a predetermined position, this limits the shot size of the resin in the shooting pot cylinder 5 to a volume created by the piston's rearward movement. At the appropriate time in the molding cycle, the shooting pot piston 6 is moved forward by the actuating rod acting on the exposed end 18 of piston 6. The forward movement of the piston 6 displaces the resin "C" from the shooting pot cylinder 5 via the channel 12 and the nozzle melt channel 26 and into the mold cavity through the mold gate. The check valve 13 prevents backflowing of the resin into the inlet channel 14. At each infeeding of the resin into the shooting pot cylinder 5, the heat sink sleeve 7 extracts sufficient heat to reduce the resin temperature and increase its viscosity to a point where leakage past the piston wall is substantially prevented.

4. The Structure of the Second Embodiment

FIG. 2 shows an alternate embodiment of the shooting pot cylinder cooling feature. A shooting pot cylinder 20 containing a shooting pot piston 21 is surrounded by a heat-sink sleeve 24 having a bore that has a sliding fit to the outer diameter of the shooting pot cylinder 20. The sleeve 24 is located in a recessed seat in a cooled manifold plate 25 and held in place by a retainer ring 22 and a spring washer 23 that constantly urges the sleeve 24 against its seat in the manifold plate, thereby ensuring good contact for thermally conducting heat from the shooting pot cylinder wall to the plate while allowing the shooting pot cylinder to thermally expand and slide within the bore of the heat-sink sleeve 24. This alternate embodiment does not require the shoulder 16 of the FIG. 1 configuration and thereby makes a slightly less costly component.

5. Conclusion

Advantageous features according to the present invention include:

A coinjection hot runner assembly with a least one shooting pot cylinder having a cooling feature near its rear end to reduce melt leakage.

Thus, what has been described is a coinjection molding shooting pot apparatus which substantially prevents leakage of the melt past the shooting pot piston by controlling the temperature of the resin inside the shooting pot cylinder.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patents and patent applications discussed above are hereby incorporated by reference into the Detailed Description of the Preferred Embodiments.

What is claimed is:

1. A method of cooling a coinjection mold shooting pot cylinder configured to inject a melt through a coinjection nozzle having a least two melt channels which end at the same gate, comprising the steps of:
    charging a shooting pot cylinder with a melt; and
    removing heat from a portion of the shooting pot cylinder to a cooled mold plate in order to increase the viscosity of melt in the shooting pot cylinder to reduce melt leakage between the shooting pot cylinder and a shooting pot piston.

2. Coinjection molding shooting pot apparatus configured to inject a melt through a coinjection nozzle having at least two melt channels ending at the same gate, said apparatus comprising:
    a shooting pot cylinder configured to hold the melt;
    a shooting pot piston configured to discharge the melt from said shooting pot cylinder; and
    cooling structure disposed to contact an outer surface of said shooting pot cylinder and remove heat therefrom, said cooling structure being configured to transfer heat to a cooled mold plate.

3. Apparatus according to claim 1, wherein said cooling structure comprises a heat sink sleeve disposed to contact a rear portion of said shooting pot cylinder.

4. Apparatus according to claim 1, wherein said cooling structure is configure to remove sufficient heat from said shooting pot cylinder to increase the viscosity of the melt therein to substantially reduce leakage of melt between said shooting pot piston and said shooting pot cylinder.

5. Apparatus according to claim 1, further comprising biasing structure configured to press said cooling structure against the cooled mold plate.

6. Coinjection molding shooting pot apparatus configured to inject a melt through a coinjection nozzle having at least two melt channels ending at the same gate, said apparatus comprising:
    a shooting pot cylinder configured to hold the melt;
    a shooting pot piston configured to discharge the melt from said shooting pot cylinder; and
    cooling structure disposed to contact an outer surface of said shooting pot cylinder and remove heat therefrom, wherein said cooling structure is configured to be in sliding engagement with an outer surface of said shooting pot cylinder.

7. Coinjection molding shooting pot cooling apparatus configured to cool a shooting pot cylinder which, in combination with a shooting pot piston, injects a melt through a coinjection nozzle having at least two melt channels ending at the same gate, said cooling apparatus comprising:
    a heat sink sleeve disposed to contact an outer surface of a rear portion of the shooting pot cylinder, said heat sink sleeve being configured to remove sufficient heat from the shooting pot cylinder to increase the viscosity of the melt therein, wherein said heat sink sleeve is configured to transfer heat to a cooled mold plate.

8. Apparatus according to claim 7, wherein said heat sink sleeve is configured to remove sufficient heat from the shooting pot cylinder to substantially reduce leakage of melt between the shooting pot piston and the shooting pot cylinder.

9. Coinjection molding shooting pot cooling apparatus configured to cool a shooting pot cylinder which, in combination with a shooting pot piston, injects a melt through a coinjection nozzle having at least two melt channels ending at the same gate, said cooling apparatus comprising:
   a heat sink sleeve disposed to contact an outer surface of a rear portion of the shooting pot cylinder, said heat sink sleeve being configured to remove sufficient heat from the shooting pot cylinder to increase the viscosity of the melt therein; and
   biasing structure configured to press said heat sink sleeve against the cooled mold plate.

10. A coinjection molding hot runner assembly configured to inject a melt through a coinjection nozzle having at least two melt channels ending at the same gate, said assembly comprising:
    a hot runner manifold configured to supply the melt to the coinjection nozzle;
    a shooting pot cylinder configured to hold a metered shot of the melt;
    a shooting pot piston configured to discharge the melt from the shooting pot cylinder;
    a cooled manifold plate;
    a heat sink disposed to remove heat from the melt inside said shooting pot cylinder; and
    a spring disposed between said shoulder and said heat sink to bias said heat sink toward said cooled manifold plate.

11. An assembly according to claim 10, wherein said shooting pot cylinder has a shoulder on an outer surface thereof configured to hold said heat sink against said cooled manifold plate, and wherein said heat sink is disposed to contact the outer surface of a rear portion of said shooting pot cylinder.

12. An assembly according to claim 10, wherein said heat sink is configured to remove sufficient heat from the shooting pot cylinder to substantially reduce leakage of melt between said shooting pot piston and said shooting pot cylinder.

13. A coinjection molding hot runner assembly configured to inject a melt through a coinjection nozzle having at least two melt channels ending at the same gate, said assembly comprising:
    a hot runner manifold configured to supply the melt to the coinjection nozzle;
    a shooting pot cylinder configured to hold a metered shot of the melt;
    a shooting pot piston configured to discharge the melt from the shooting pot cylinder;
    a cooled manifold plate;
    a heat sink disposed to remove heat from the melt inside said shooting pot cylinder;
    a retainer ring removably coupled to said cooled manifold plate; and
    a spring washer disposed between said retainer ring and said heat sink to urge said heat sink toward said cooled manifold.

14. A coinjection molding hot runner assembly configured to inject a melt through a coinjection nozzle having at least two melt channels ending at the same gate, said assembly comprising:
    a hot runner manifold configured to supply the melt to the coinjection nozzle;
    a shooting pot cylinder configured to hold a metered shot of the melt;
    a shooting pot piston configured to discharge the melt from the shooting pot cylinder;
    a cooled manifold plate;
    a heat sink disposed to remove heat from the melt inside said shooting pot cylinder, wherein said heat sink comprises a heat sink sleeve configured for sliding engagement with an outer surface of said shooting pot cylinder.

15. A coinjection molding machine, comprising:
    a mold cavity;
    a coinjection nozzle having at least two melt channels ending at the same gate, and configured to inject a melt into said mold cavity;
    a hot runner manifold configured to carry the melt to said coinjection nozzle;
    a shooting pot cylinder configured to discharge the melt to said hot runner manifold;
    a shooting pot piston configured to discharge the melt from said shooting pot cylinder; and
    heat sink structure configured to remove heat from said shooting pot cylinder to increase the viscosity of the melt therein, wherein said heat sink structure a heat sink sleeve configured for sliding engagement with an outer surface of a rear portion of said shooting pot cylinder.

16. A molding machine according to claim 15, wherein said heat sink structure is configured to remove sufficient heat from said shooting pot cylinder to substantially reduce leakage of melt between said shooting pot piston and said shooting pot cylinder.

* * * * *